May 6, 1958     H. L. McFEATERS     2,833,586

SCRAP BOX CONSTRUCTION

Filed April 28, 1955     3 Sheets-Sheet 1

INVENTOR.
Harry L. McFeaters
BY Green, McCallister and Miller
HIS ATTORNEYS

May 6, 1958  H. L. McFEATERS  2,833,586
SCRAP BOX CONSTRUCTION
Filed April 28, 1955  3 Sheets-Sheet 2
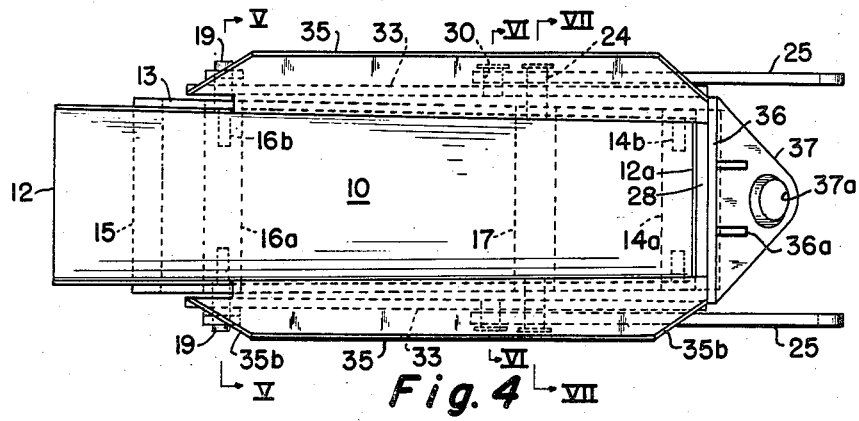
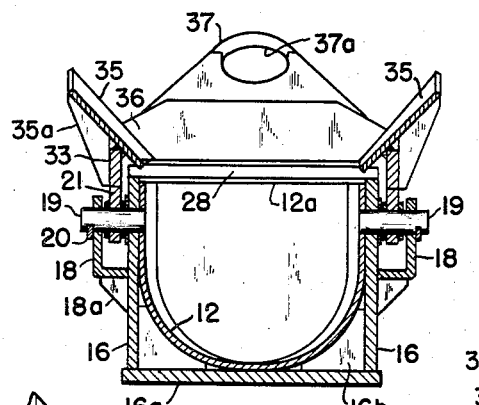
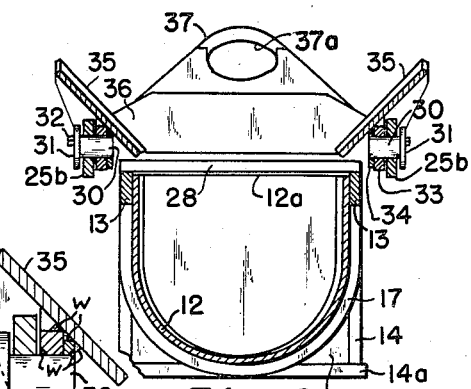
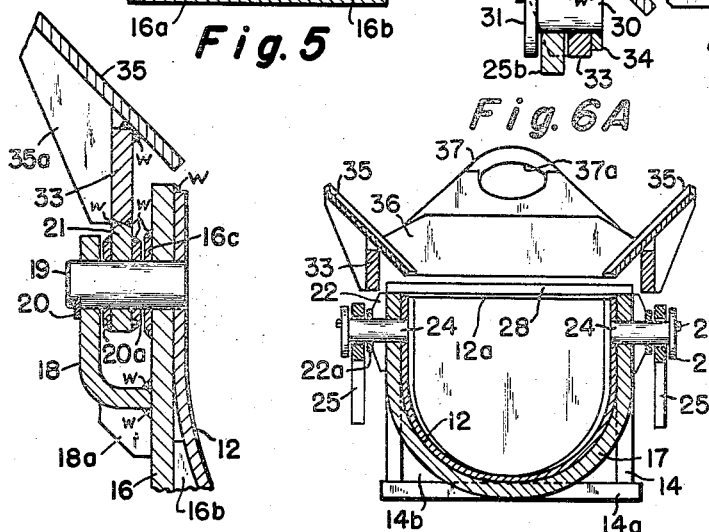
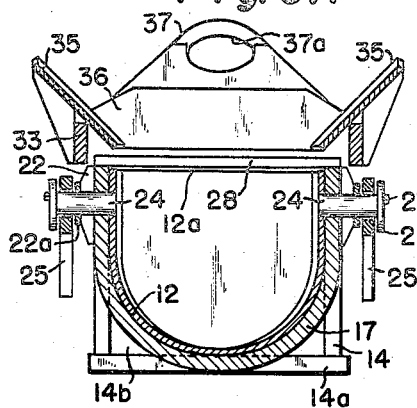
INVENTOR.
Harry L. McFeaters
BY Green, McCallister and Miller
HIS ATTORNEYS May 6, 1958    H. L. McFEATERS    2,833,586
SCRAP BOX CONSTRUCTION
Filed April 28, 1955     3 Sheets-Sheet 3
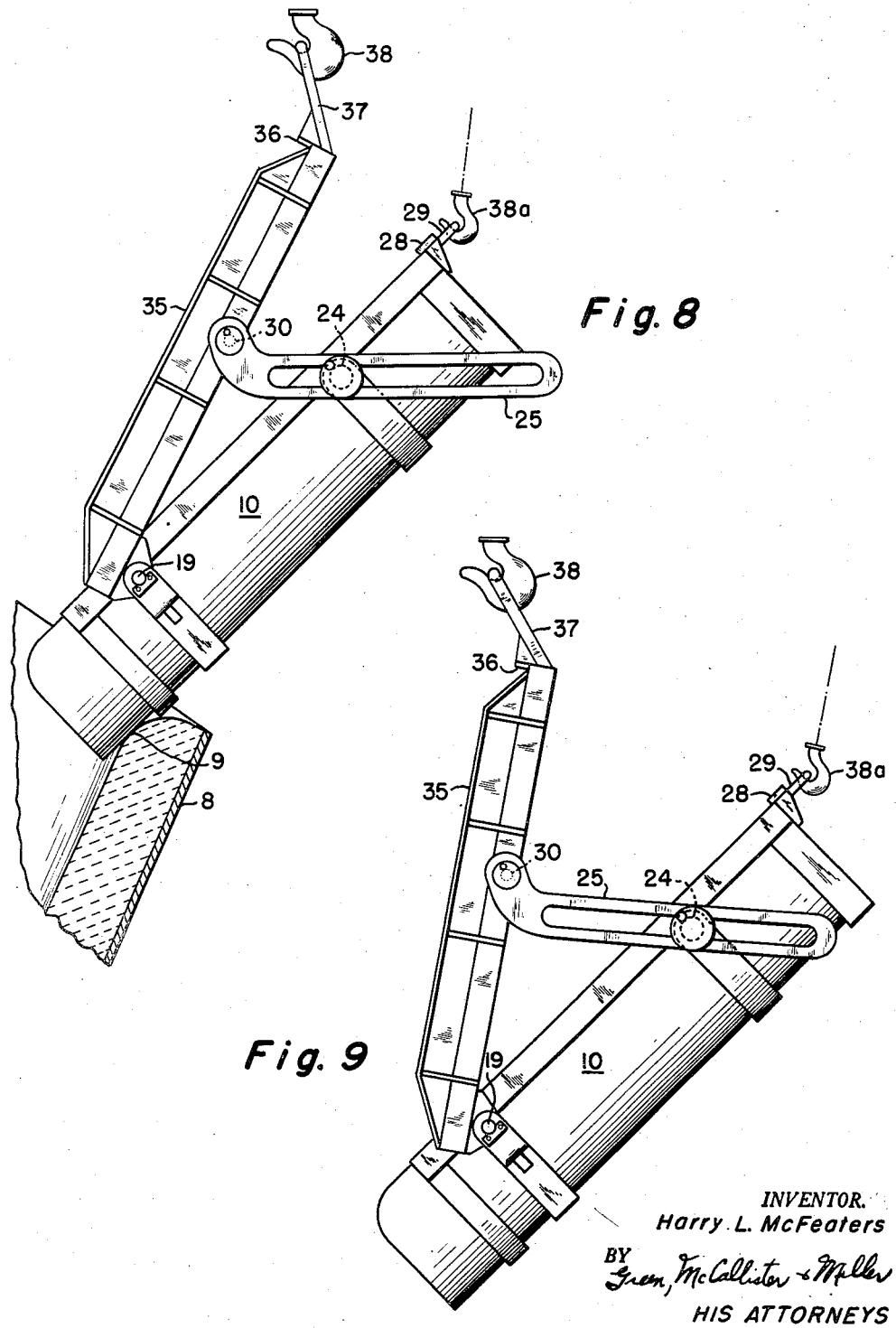
INVENTOR.
Harry L. McFeaters
BY
HIS ATTORNEYS

United States Patent Office 2,833,586
Patented May 6, 1958

2,833,586

SCRAP BOX CONSTRUCTION

Harry L. McFeaters, New Castle, Pa., assignor to Pennsylvania Engineering Corporation, New Castle, Pa., a corporation of Pennsylvania Application April 28, 1955, Serial No. 504,604

7 Claims. (Cl. 294—73)

This invention relates to a scrap box and particularly, to an improved box structure that is provided with a bail or lift for handling it. In accordance with my invention, I have provided an improved box structure for handling scrap material such as is charged into a furnace or converter in the making of metal, such as steel.

An object of my invention has been to provide an improved scrap box structure and one which can be effectively and efficiently handled;

Another object has been to devise a scrap box having its own bail or lift frame for handling purposes;

These and many other objects of my invention will appear to those skilled in the art from the disclosure thereof.

In the drawings, Figure 1 is a side view in elevation of a box structure constructed in accordance with my invention showing it in a normal position to receive scrap and further, illustrating a preliminary step in lifting it from one location to another;

Figure 4 is a top plan view on the scale of Figures 1 to 3 of the box structure of my invention;

Figures 5, 6 and 7 are cross sectional views in end elevation taken respectively along the lines V—V, VI—VI and VII—VII of Figure 4;

Figures 5A, 6A and 7A are enlarged sectional fragments to better illustrate the respective pin mounts shown in Figures 5, 6 and 7;

Figure 1:
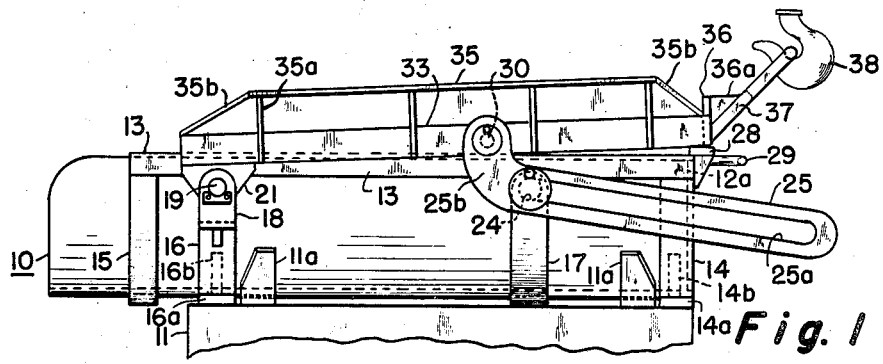

And, Figures 8 and 9 are side views in elevation on the scale of Figure 1 showing how a scrap box of my construction may be handled by an overhead crane means having an auxiliary hook; more specifically, Figure 8 shows how it may cooperate with a furnace sill or converter nose and Figure 9 shows how it may be suspended to discharge scrap without any additional supporting means.

In accordance with my invention, I have devised and provided a scrap box or structure 10 that is elongated longitudinally, and that has a scrap-receiving, container-shaped basket or wall body 12. The sides and bottom of the body 12 are reinforced and carried by a cradle frame and its open, scrap-receiving top or mouth portion is bounded on three of its dimensions (its opposite sides and its rear or back side or end) by a self-return bail or lift frame of U or fork shape.

The box structure 10 may be positioned or carried on a platform 11 for charging scrap material to a refining vessel by upwardly tilting or raising its back portion with respect to its open front or delivery end portion or may be carried on and directly tilted by a scrap car having a tilting support therefor. The box wall or body 12 is shown as having a curved bottom with relatively flat side walls, but may have sloping sides for easy release of scrap or have parallel sides for heavy melting scrap. Upwardly-projecting and outwardly-inclined lugs 11a (see Figures 1 and 2) aid in guiding the box 10 to a proper seat on the platform 11.

The bail or lift frame or structure is pivotally mounted on and with respect to the box wall body 12 and the cradle frame at fixed pivot or pin points 19 adjacent the front end of the structure, so that it may be raised and lowered thereabout by means of a bail portion 37 whose eye 37a may be engaged by the hook 38 of an overhead crane. A pair of transversely spaced-apart guide arms 25 are pivotally secured at fixed points 30 on opposite sides of and substantially centrally of the lift frame and have guide slots 25a therealong to slidably receive rearwardly-located or positioned pivot pins 24 that project from the cradle frame and body structure.

As shown particularly in Figure 1 of the drawings, when the box 10 is resting on a suitable support 11, its bail or lift frame is in a lowered position and the pair of slide pivot connections adjacent the back or rear end portion of the body and cradle structure are at their forward positions in the guide slots 25a of arms 25, whereby the arms lie within top and bottom planes of the box structure. When, however, the lift frame is lifted to raise the box structure, see Figure 2, it is apparent that rear pivots 24 move towards their extreme rearward positions in the guide slots of the arms 25 to define with the forward pivot points and with the lift frame and its arms, a triangular supporting assembly for suspending the box structure 10 in a balanced, self-adjusting and mass-centering relationship from the hook 38 of an overhead crane.

Guide arms 25 and their operative mountings, in effect, provide a balancing of the box 10 from its point of suspension 37a, so that it may be held substantially level or horizontal without danger of spilling the scrap. However, when thus held, the body of the box may be manually tilted about its forward pivots 19 by raising its rear or back end portion upwardly with respect thereto.

Figure 3:
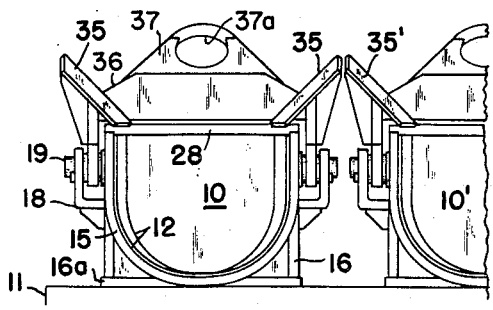
Figure 3 is an end view (front) in elevation on the scale of Figures 1 and 2 and showing a scrap box of my invention in an adjacent cooperating relationship which it may have with another, side-positioned scrap box.

The lift or bail frame, as shown particularly in Figure 3 of the drawings, has side deflector plates 35 for properly loading the body 12 of the box and for cooperating with adjacent boxes to prevent spillage of scrap therebetween. Thus, this frame serves a dual purpose and facilitates a tilting of the body of the box when desired, but only by the application of some external means apart from the suspension means 37 which may be employed for moving it from one place to another.

The box structure 10 has a shaped body or scrap-receiving wall 12 of transversely limited and longitudinally elongated extent and whose forward end (left end of Figures 1, 2 and 4 of the drawings) is employed for delivering scrap to a furnace or converter. It is supported by an outer cradle frame that has a pair of transversely spaced-apart, longitudinally-extending upper side members or pieces 13 (see particularly Figures 2 and 6 of the drawings), suitably spaced-apart and connecting vertical side ribs, upright pieces or members 14 and 16, and bends or loop segment pieces or members 15 and 17. The members 15, 16, 17 and 18 have a longitudinally spaced-apart relationship with each other and the members 16 and 17 serve to position pivoting or pin means for the bail or lift frame. The vertical or upright members or pieces 14 and 16 are secured or welded respectively to bottom cross members 14a and 16a; gusset pieces or members 14b and 16b are also secured or welded in position, as shown in Figures 1, 2, 5 and 6. The cradle frame may be spot-welded to the body member or wall 12 to provide a unitary structure whose body wall is strengthened and reinforced by its cradle frame.

As shown particularly in Figures 1, 4 and 5, the pair of opposed side upright members 16 which are located forwardly of the structure along the container wall 12 carry inner ends of pivots, studs or pin shafts 19 thereon to project outwardly therefrom. In the drawings, I have throughout indicated weld metal by the reference w. Each pivot, pin or stud 19 projects outwardly through a supporting wall of an angle-shaped box-defining member 18 and carries a keeper 20. The box member 18 is reinforced by ribbing 18a and serves as an open top container with the member 16 for each of a pair of downwardly-projecting side or pivot ears 21 of the lift or bail frame. As shown particularly in Figures 5 and 5A, a bearing washer 16c is welded or secured to the face of each member 16 about the stud 19, and a pair of spacer and wear surfaces or washers 20a are welded or secured to opposite sides of each of the pivot ears 21.

As shown particularly in Figures 1, 2, 4, 7 and 7A, the backwardly-offset or positioned, vertical loop segment or member 17 with the wall body 12 carry pivot, pin or stud shafts 24 which project outwardly therefrom. A spacer disc 22 and bearing washer 22a are secured to project outwardly from each member 17 to cooperate with the one of the pair of guide or slide-pivot arms 25 which is held in position on one of the pivots 24 by an end plate 26 and a tap bolt 27. As shown particularly in Figures 1 and 2, the studs or pivots 24 are free to move or slide in a guided relationship along longitudinal slots 25a of the arms 25 when the bail or lift frame is raised and lowered.

Referring particularly to Figures 1, 2, 4, 6 and 6A, the arms 25 have upper end portions 25b of angular or crank-like offset shape to receive and pivot about a pair of pivot, pin or stud shafts 30. The pivots 30 are secured, as by welding, to longitudinally-extending side strips 33 of the lift or bail frame and reinforcing pieces 34. The portions 25b of the arms 25 are held in operative positioning on the pivots 30 by end plates 31 and tap bolts 32.

As shown particularly in Figures 1 and 4 to 7, inclusive, the lift or bail frame has a pair of longitudinally-extending, bottom-mounted, side members or pieces 33, a pair of upwardly-outwardly inclining and inwardly-downwardly declining, opposed, side deflector plates or members 35, reinforcing ribs 35a, an integral back end connecting piece 36, a pair of upright, reinforcing, transversely-extending vertical ribs 36a, and an upwardly and outwardly inclined bail portion or part 37 that is secured or welded in position to project backwardly therefrom. The bail portion 37, as shown particularly in Figure 4, is provided with an eye portion 37a for receiving the hook 38 of an overhead crane.

It is thus apparent that I have provided a lift or a bail frame which normally has a lowered, cooperating relationship with respect to the open mouth or top of the box structure 10 to aid in feeding and guiding scrap into the container body 12. The lift or bail frame is raised to automatically balance the box structure and any content thereof by its rear end or bail portion 37, as when it is engaged by a crane and the crane starts a lifting operation. Fixed points of support are represented by the pivot pins 19 and 30 and a variable point support is represented by the cooperative mounting between the arms 25 and pivot pins 24.

Figure 2:
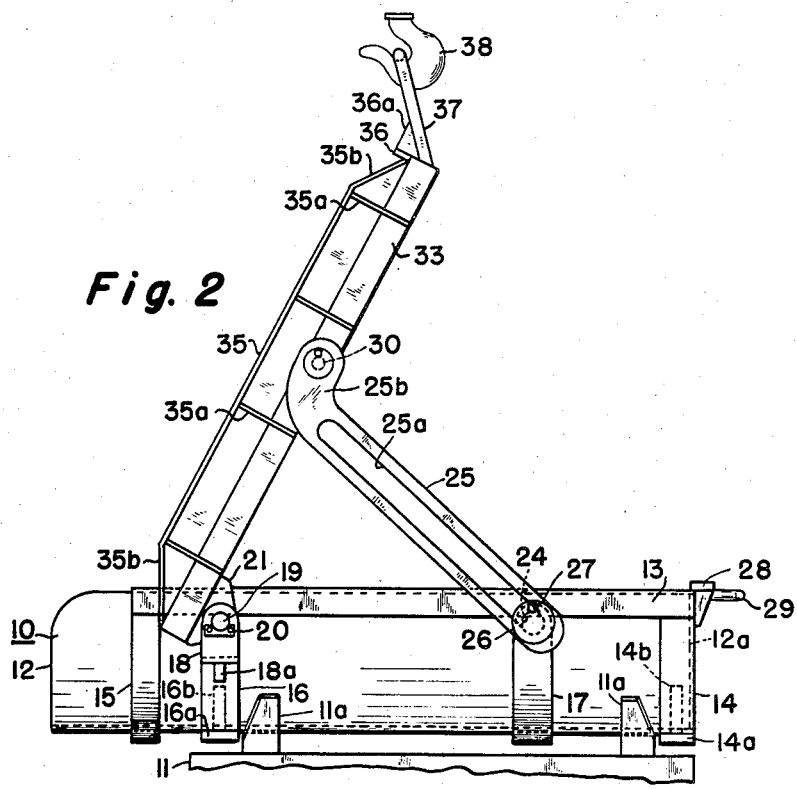
Figure 2 is a view similar to Figure 1, but disclosing a second step in the handling and transportation of a box structure constructed in accordance with my invention; in this figure, its self-returning bail frame has been moved or lifted to an overhead box-supporting and carrying position and the box has been raised off its support for movement to a new location.

As shown particularly in Figures 1, 2 and 3, the cradle has a transversely-projecting abutment ledge or member 28 for receiving the back end of the lift or bail frame, in order to cushion its return and save wear and tear on the other portions of the structure. As shown particularly in Figures 3 and 4, the pair of side deflector plates or members 35 are sloped transversely towards inward convergence to aid in entering scrap into the body 12 of the device or structure and have tapered forward and backward end portions 35b. As indicated in Figure 4 of the drawings, the body or basket 12 may converge slightly towards its back end or enclosing wall portion 12a to provide divergence at its open front or delivery end. However, the outer sides of the members 35 of the lift frame are shown parallel to cooperate with a member 35' of an adjacently positioned box 10' (see Figure 3). The bail or lift frame is self-returning, lowering or righting when its bail portion 37 is released, since its weight is concentrated towards its back portion to cause it to move downwardly about pivot pins 19 from the position of Figure 2 to the position of Figure 1.

It is thus apparent that I have been able to provide an improved scrap box for furnace and converter utilization. It employs a container-shaped wall body 12 having an open mouth or top portion to receive the scrap and a front end portion to deliver the scrap, when the back portion of the body is raised or pivoted about the front end portion thereof. The container body has a substantially U-shaped lift frame positioned along its opposite sides and back transverse side which is pivotally suspended and horizontally balanced when the lift frame is in a raised position, see Figure 2 of the drawings. The lift bail portion 37 projects upwardly from the rear side of the lift frame to raise it substantially vertically with respect to the body 12, in such a manner as to both suspend and horizontally balance or level the latter. The lift frame is additionally constructed and balanced for self-returning, righting or lowering movement with respect to the container body when the bail portion 37 is released. In addition, the pivot mounting means between the container body 12 and the lift frame has self-adjusting portions including the arms 25 that hold or support the body in a substantial level relationship when it is suspended by the bail portion 37.

Although, as shown in Figures 1, 2 and 3 of the drawings, the scrap box 10 of my construction may be tilted on or about a platform or cradle 11, in Figures 8 and 9, I have disclosed how it may be employed independently of such an agency. In the latter utilization, a bail portion 29 is employed. This portion 29 corresponds in construction to the portion 37, and is welded or secured to project or incline backwardly from the abutment ledge or member 28 of the container body.

As shown in Figures 8 and 9, the eye of the bail portion 29 is adapted to be engaged by a second or auxiliary hook 38a of the overhead crane means. As a result, the scrap box 10 may be handled by the overhead crane independently of a platform, car, cradle etc. In this utilization, the auxiliary hook 38a aids in suspending the box and essentially, is used to vertically raise the rear end portion of the box to tilt it and discharge its scrap content. On the other hand, the hook 38 essentially has a suspending and balancing function, although it does raise the lift frame to facilitate the discharge of scrap.

As shown in Figure 9, the box 10 may be tilted in a fully overhead or suspended position or, as shown in Figure 8, its forward end portion may rest on the nose of a converter or on the sill of a furnace wall 8. In this latter utilization, the forward end portion is pivoted and supported about or on the wall 8 at 9. Employing the box 10 in the manner illustrated in Figure 8, scrap may be directly discharged into the mouth of a vessel or furnace and employing the arrangement of Figure 9, it may be dumped into a pile or a box or other receptacle.

What I claim is:

1. An improved scrap box for furnace and converter utilization which comprises, a container-shaped longitudinally-elongated body having an open mouth portion to receive scrap and an open front end portion to deliver scrap when said body is tilted forwardly, a lift frame positioned along said mouth portion, means pivotally mounting said lift frame on said body for raising and lowering movement with respect thereto, said means including a pair of guide arms that are pivotally secured on said lift frame to project therefrom, said arms having longitudinally extending guide slots therealong, and said means including pivot means secured on said body to slidably cooperate with said guide slots.

2. An improved scrap box as defined in claim 1 wherein said lift frame has a pair of oppositely-positioned and longitudinally-extending side deflector members, and said side deflector members incline upwardly and outwardly from said body to guide scrap material into said mouth portion and to cooperate with similar members of adjacently positioned scrap boxes of similar construction.

3. An improved scrap box for furnace and converter utilization which comprises, a container-shaped wall body having an open mouth portion to receive scrap and a front end portion to deliver scrap, a lift frame positioned along opposite sides of said container body, means pivotally suspending and horizontally balancing said container body from said lift frame when the latter is in a raised position, a lift bail on said lift frame for raising it substantially vertically with respect to said container body to its suspending and horizontally balancing relationship, and said lift frame having sloped slide members to guide scrap through the open mouth portion into said body.

4. An improved scrap box for furnace and converter utilization which comprises, a container-shaped longitudinally-elongated body having an open top portion to receive scrap and an open front end portion to deliver scrap when said body is tilted forwardly, a lift frame positioned along said open top portion, means pivotally mounting said lift frame on said body for raising and lowering movement with respect thereto, a bail portion for raising said lift frame on said body and for suspending said body, said lift frame being constructed and balanced for self-lowering movement on said body, means having self-adjusting portions to support said body in a substantially level relationship when said body is suspended by said bail portion; said pivotally mounting means comprising, a pivot means connecting front end portion of said lift frame to the front end portion of said body, and a second pivot means connecting a back portion of said lift frame to a back portion of said body; said second pivot means cooperating with said self-adjusting portions.

5. An improved scrap box as defined in claim 4 wherein, a cradle frame is positioned about said body and is secured in place thereon, and said lift frame has pivot pins secured within and projecting outwardly from said body and said cradle frame.

6. An improved scrap box as defined in claim 4 wherein, said lift frame has a bail for raising it substantially vertically with respect to said container body, and a lift bail is secured on a rear end portion of said container body for raising it vertically to tilt its front end portion forwardly and deliver scrap therefrom.

7. An improved scrap box for furnace and converter utilization which comprises, a container-shaped wall body having an open mouth portion to receive scrap and a front end portion to deliver scrap, a lift frame positioned along opposite sides of said container body, means pivotally suspending and horizontally balancing said container body from said lift frame when the latter is in a raised position, a lift bail on said lift frame for raising it substantially vertically with respect to said container body to its suspending and horizontally balancing relationship; said pivotally suspending means comprising, forward pivot means connecting a front end portion of said lift frame to a corresponding portion of said body, swing arm means operatively connecting back portions of said lift frame and said container body together to limit swing of said lift frame about said forward pivot means, and said swing arm means comprising slide pivot means operatively mounted to position said lift frame forwardly-upwardly with respect to said body when said lift frame is raised.

References Cited in the file of this patent

UNITED STATES PATENTS

| 883,839   | Swasey      | Apr. 7, 1908  |
| 1,180,690 | Berg        | Apr. 25, 1916 |
| 1,767,467 | Locher et al. | June 24, 1930 |
| 1,875,730 | Hively      | Sept. 6, 1932 |
| 2,141,702 | Walsh       | Feb. 25, 1938 |